(12) United States Patent
Kim et al.

(10) Patent No.: US 12,456,771 B2
(45) Date of Patent: Oct. 28, 2025

(54) BATTERY RACK, POWER STORAGE DEVICE, AND DATA STORAGE DEVICE

(71) Applicant: LG ENERGY SOLUTION, LTD., Seoul (KR)

(72) Inventors: Hee-Chan Kim, Daejeon (KR); Seung-Jun Lee, Daejeon (KR); Kown Son, Daejeon (KR); Kyung-Min Lee, Daejeon (KR); Goan-Su Jung, Daejeon (KR); Sang-Woo Hong, Daejeon (KR); Jong-Soo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 549 days.

(21) Appl. No.: 17/928,056

(22) PCT Filed: Sep. 28, 2021

(86) PCT No.: PCT/KR2021/013282
§ 371 (c)(1),
(2) Date: Nov. 28, 2022

(87) PCT Pub. No.: WO2022/085971
PCT Pub. Date: Apr. 28, 2022

(65) Prior Publication Data
US 2023/0216138 A1 Jul. 6, 2023

(30) Foreign Application Priority Data
Oct. 19, 2020 (KR) .......................... 10-2020-0135394

(51) Int. Cl.
*H01M 50/20* (2021.01)
*H01M 10/46* (2006.01)
(Continued)

(52) U.S. Cl.
CPC ........... *H01M 50/20* (2021.01); *H01M 10/46* (2013.01); *H01M 10/658* (2015.04);
(Continued)

(58) Field of Classification Search
CPC ...................................................... H01M 50/20
(Continued)

(56) References Cited

U.S. PATENT DOCUMENTS

| 4,685,402 | A | * | 8/1987 | Nelson | .................... | E05G 1/024 |
| | | | | | | 312/409 |
| 2005/0084748 | A1 | * | 4/2005 | Miller | ............... | H01M 10/6557 |
| | | | | | | 211/13.1 |

(Continued)

FOREIGN PATENT DOCUMENTS

| CN | 206789901 U | 12/2017 |
| CN | 209357808 U | 9/2019 |

(Continued)

OTHER PUBLICATIONS

International Search Report (PCT/ISA/210) issued in PCT/KR2021/013282, dated Jan. 27, 2022.
(Continued)

*Primary Examiner* — Jerry D Robbins
(74) *Attorney, Agent, or Firm* — Birch, Stewart, Kolasch & Birch, LLP

(57) ABSTRACT

The battery rack includes: a plurality of battery modules; a rack case configured to store the plurality of battery modules; a control unit configured to control charging and discharging of the plurality of battery modules; a data storage unit including a cable configured to transmit data from the control unit and a data recording unit configured to store the data; and a storage unit including an accommodating case having an inside space for accommodating the data recording unit, a plurality of ventilation holes formed by
(Continued)

opening a portion of the accommodating case so that the inside space and the outside are communicated with each other, and a cover portion that has a plate shape, is spaced apart from the plurality of ventilation holes by a predetermined interval, and is configured to cover the plurality of ventilation holes.

14 Claims, 10 Drawing Sheets

(51) Int. Cl.
*H01M 10/658* (2014.01)
*H01M 50/30* (2021.01)
*H02J 7/00* (2006.01)
*H01M 10/42* (2006.01)

(52) U.S. Cl.
CPC ........ *H01M 50/394* (2021.01); *H02J 7/0042* (2013.01); *H01M 2010/4271* (2013.01); *H01M 2010/4278* (2013.01)

(58) Field of Classification Search
USPC ......................................................... 320/128
See application file for complete search history.

(56) References Cited

U.S. PATENT DOCUMENTS

| | | | | |
|---|---|---|---|---|
| 2005/0111136 A1* | 5/2005 | Miyamoto | ................ | G06F 1/20 |
| 2005/0259404 A1* | 11/2005 | Marraffa | ............. | H01M 50/224 |
| | | | | 361/726 |
| 2005/0286225 A1* | 12/2005 | Moore | .................... | G06F 1/182 |
| | | | | 174/547 |
| 2006/0075509 A1* | 4/2006 | Kishon | ................... | G06F 11/00 |
| | | | | 714/E11.018 |
| 2007/0017685 A1* | 1/2007 | Moore | .................... | H05K 5/021 |
| 2009/0050365 A1* | 2/2009 | Moore | .................... | H05K 5/021 |
| | | | | 174/547 |
| 2009/0179536 A1* | 7/2009 | Moore | .............. | G11B 33/1446 |
| | | | | 312/223.2 |
| 2009/0219679 A1* | 9/2009 | Moore | .................... | G06F 1/20 |
| | | | | 312/213 |
| 2012/0255039 A1* | 10/2012 | Sipes | ................. | G06F 11/1464 |
| | | | | 726/34 |
| 2013/0286576 A1* | 10/2013 | Toya | ....................... | G06F 1/182 |
| | | | | 361/679.02 |
| 2015/0093982 A1* | 4/2015 | Bailey | ................. | H01M 50/224 |
| | | | | 454/184 |
| 2015/0155742 A1* | 6/2015 | Bailey | ....................... | H02J 9/04 |
| | | | | 307/77 |
| 2016/0056428 A1* | 2/2016 | Kim | .................... | H01M 50/505 |
| | | | | 211/59.4 |
| 2016/0330861 A1* | 11/2016 | Moore | ............... | G11B 33/1426 |
| 2019/0312314 A1 | 10/2019 | Bossi | | |
| 2020/0128683 A1* | 4/2020 | Heller | .................. | G11B 33/025 |
| 2021/0074967 A1* | 3/2021 | Kim | .................... | H01M 4/5825 |
| 2021/0074971 A1* | 3/2021 | Kim | .................... | H01M 10/6561 |
| 2021/0074972 A1* | 3/2021 | Kim | .................... | H01M 10/613 |
| 2021/0074975 A1* | 3/2021 | Kwak | ................. | H01M 50/383 |
| 2021/0074979 A1* | 3/2021 | Kwak | ............... | H01M 10/6557 |
| 2021/0074980 A1* | 3/2021 | Kim | ....................... | H01M 4/525 |
| 2021/0259094 A1* | 8/2021 | Chang | .................... | H05K 1/189 |
| 2022/0115737 A1* | 4/2022 | Shin | ................... | H01M 10/613 |
| 2022/0123386 A1* | 4/2022 | Kim | ................... | H01M 50/271 |
| 2022/0123429 A1* | 4/2022 | Yoo | ................... | H01M 50/207 |
| 2023/0033625 A1* | 2/2023 | Kim | ................... | H01M 50/30 |
| 2023/0395934 A1* | 12/2023 | Kwak | ................ | H01M 50/209 |
| 2024/0128557 A1* | 4/2024 | Kim | .................... | H01M 10/658 |
| 2025/0183464 A1* | 6/2025 | Hardy | ................ | H01M 50/271 |

FOREIGN PATENT DOCUMENTS

| | | |
|---|---|---|
| CN | 210556961 U | 5/2020 |
| JP | 2012-9309 A | 1/2012 |
| KR | 10-0370393 B1 | 1/2003 |
| KR | 10-0980745 B1 | 9/2010 |
| KR | 10-1096787 B1 | 12/2011 |
| KR | 10-1299091 B1 | 9/2013 |
| KR | 10-1364036 B1 | 2/2014 |
| KR | 10-1440881 B1 | 9/2014 |
| KR | 10-1478060 B1 | 1/2015 |
| KR | 10-2016-0109640 A | 9/2016 |
| KR | 10-2019-0077578 A | 7/2019 |
| KR | 10-2086842 B1 | 3/2020 |

OTHER PUBLICATIONS

European Search Report for European Application No. 21883043.8, dated Jul. 24, 2024.

* cited by examiner

BATTERY RACK, POWER STORAGE DEVICE, AND DATA STORAGE DEVICE

TECHNICAL FIELD

The present disclosure relates to a battery rack, an energy storage system, and a data storage device, and more particularly, to a battery rack, an energy storage system, and a data storage device, which are capable of safely storing a data recording unit from fire.

The present application claims priority to Korean Patent Application No. 10-2020-0135394 filed on Oct. 19, 2020 in the Republic of Korea, the disclosures of which are incorporated herein by reference.

BACKGROUND ART

Currently commercialized secondary batteries include nickel cadmium batteries, nickel hydrogen batteries, nickel zinc batteries, and lithium secondary batteries, wherein compared to nickel-based secondary batteries, the lithium secondary batteries have little memory effect, and thus, are attracting attention because of their advantages such as free charge and discharge, extremely low self-discharge rate, and high energy density.

The lithium secondary batteries use a lithium-based oxide and a carbon material as a positive electrode active material and a negative electrode active material, respectively. Lithium secondary batteries include an electrode assembly in which a positive electrode plate and a negative electrode plate, to which a positive electrode active material and a negative electrode active material are applied, respectively, are arranged with a separator therebetween, and a packaging material for sealing and accommodating the electrode assembly together with an electrolyte, that is, a battery pouch packaging material.

Recently, secondary batteries have been widely used not only in small devices such as portable electronic devices, but also in medium and large devices such as vehicles or energy storage systems. When used in the medium and large devices, a number of secondary batteries are electrically connected to each other to increase capacity and output. Especially, pouch-type secondary batteries are widely used in the medium and large devices due to an advantage of easy stacking.

Meanwhile, as a need for a large-capacity structure, including use as an energy storage source, increases, there is an increasing demand for a plurality of secondary batteries electrically connected in series and/or parallel, and a battery rack including a battery module accommodating the secondary batteries therein and a battery management system (BMS).

Also, the battery rack generally includes a rack case of a metal material to protect a plurality of battery modules from external impact or accommodate and store the plurality of battery modules. Furthermore, recently, as a demand for a high-capacity battery rack is increasing, a demand for a battery rack accommodating a plurality of battery modules of a heavy load is increasing.

The battery rack may include a control unit for controlling charging and discharging of a plurality of battery modules and a data storage device for receiving, from the control unit, and recording status information of the battery modules or information on controlling and operating the battery modules.

However, in battery racks of the related art, when thermal runaway of secondary batteries of each battery module occurs or secondary batteries ignite or explode, a data storage device included therein as well as the battery module is entirely burnt down, and thus, it is not possible to check status information of the battery module analyzed by a control unit, and thus, it is difficult to identify the cause of the ignition.

DISCLOSURE

Technical Problem

The present disclosure is designed to solve the problems of the related art, and therefore the present disclosure is directed to providing a battery rack, an energy storage system, and a data storage device, which are capable of safely storing a data recording unit from fire.

Other objects and advantages of the present disclosure may be understood from the following description and will become more fully apparent from embodiments of the present disclosure. Also, it will be easily understood that the objects and advantages of the present disclosure may be realized by the means shown in the appended claims and combinations thereof.

Technical Solution

A battery rack according to the present disclosure for achieving the object includes:
  a plurality of battery modules;
  a rack case configured to store the plurality of battery modules;
  a control unit configured to control charging and discharging of the plurality of battery modules;
  a cable configured to transmit data from the control unit and a data recording unit recorder configured to store the data; and
  at least one accommodating case having an inside space for accommodating the data recorder, a plurality of ventilation holes in the at least one accommodating case so that the inside space and outside are communicated with each other, and a cover that has a plate shape, is spaced apart from the plurality of ventilation holes by a predetermined interval, and is configured to cover the plurality of ventilation holes.
  Also, the cover may include
  an outer panel located outside the at least one accommodating case, spaced apart from the plurality of ventilation holes by a first predetermined distance, and configured such that an edge portion is bent and extends to be coupled to the at least one accommodating case.
  Also, the cover may include
  an inner panel located in the inside space of the at least one accommodating case, spaced apart from the plurality of ventilation holes by a second predetermined distance, and configured such that an edge portion is bent and extends to be coupled to the at least one accommodating case.
  Furthermore, the at least one accommodating case may include:
  an inner frame including an inner upper wall, an inner rear wall, and an inner side wall, which are configured to cover the data recorder;
  a heat insulating member configured to surround an outer surface of each of the inner upper wall, the inner rear wall, and the inner side wall of the inner frame; and an outer frame including an upper wall, a lower wall, a left wall, a right wall, and a front door, which are configured to surround an outer surface of the heat insulating member.

Also, the at least one accommodating case may further include:

a cable hole configured such that the cable is inserted, the cable hole being formed in the front door; and a cable insertion space extending from the cable hole to the inside space and bending at least once.

Furthermore, the inner frame may include a stopper configured to support and fix the data recorder to at least one of the inner upper wall, the inner rear wall, and the inner side wall.

Also, the at least one accommodating case may include at least one outwardly extending partition wall.

Furthermore, the battery rack may further include at least two accommodating case arranged in a vertical direction, and a stacking bracket including a main body portion coupled to each of the at least two accommodating case and bent along an outer surface, and an intervening portion bent and extending from an end portion of the main body portion to be interposed between the at least two accommodating case.

Also, an energy storage system of the present disclosure for achieving the above object includes at least one battery rack.

Also, a data storage device of the present disclosure for achieving the above object includes: a data storage unit comprising a cable configured to transmit battery control data from a control unit configured to control charging and discharging of a battery module, and a data recorder configured to store the data; and an accommodating case having an inside space for accommodating the data recording unit, a plurality of ventilation holes in the accommodating case so that the inside space and outside are communicated with each other, and a cover that has a plate shape, is spaced apart from the plurality of ventilation holes by a predetermined interval, and is configured to cover the plurality of ventilation holes.

The plurality of ventilation holes may be in a top wall of the at least one accommodating case, and a wall may extend upwardly from a perimeter of the top wall.

The plurality of ventilation holes may be in a top wall of the at least one accommodating case, and a wall may extend upwardly around each of the plurality of ventilation holes.

Advantageous Effects

According to one aspect of the present disclosure, air circulation between the outside and the inside space may be performed well by an accommodating case including a plurality of ventilation holes, and temperature adjustment of a data recording unit accommodated in a storage unit may be performed well. Furthermore, the present disclosure includes the storage unit including a cover portion, thereby preventing an external high-temperature flame from being directly introduced through the plurality of ventilation holes in case of fire in a battery module. Accordingly, the present disclosure may prevent the data recording unit from being entirely burnt down due to the fire.

Furthermore, according to one aspect of the present disclosure, the present disclosure includes a cable hole and a cable insertion space, thereby extending a cable connected to a data recording unit from the inside space of a storage unit to the outside, and at the same time, preventing a flame from being introduced to the inside space for accommodating the data recording unit due to a shape of the cable insertion space that is bent at least once, even when an external flame is introduced through the cable hole. Accordingly, the present disclosure may safely protect the data recording unit from fire even in case of fire in a battery rack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE OF DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
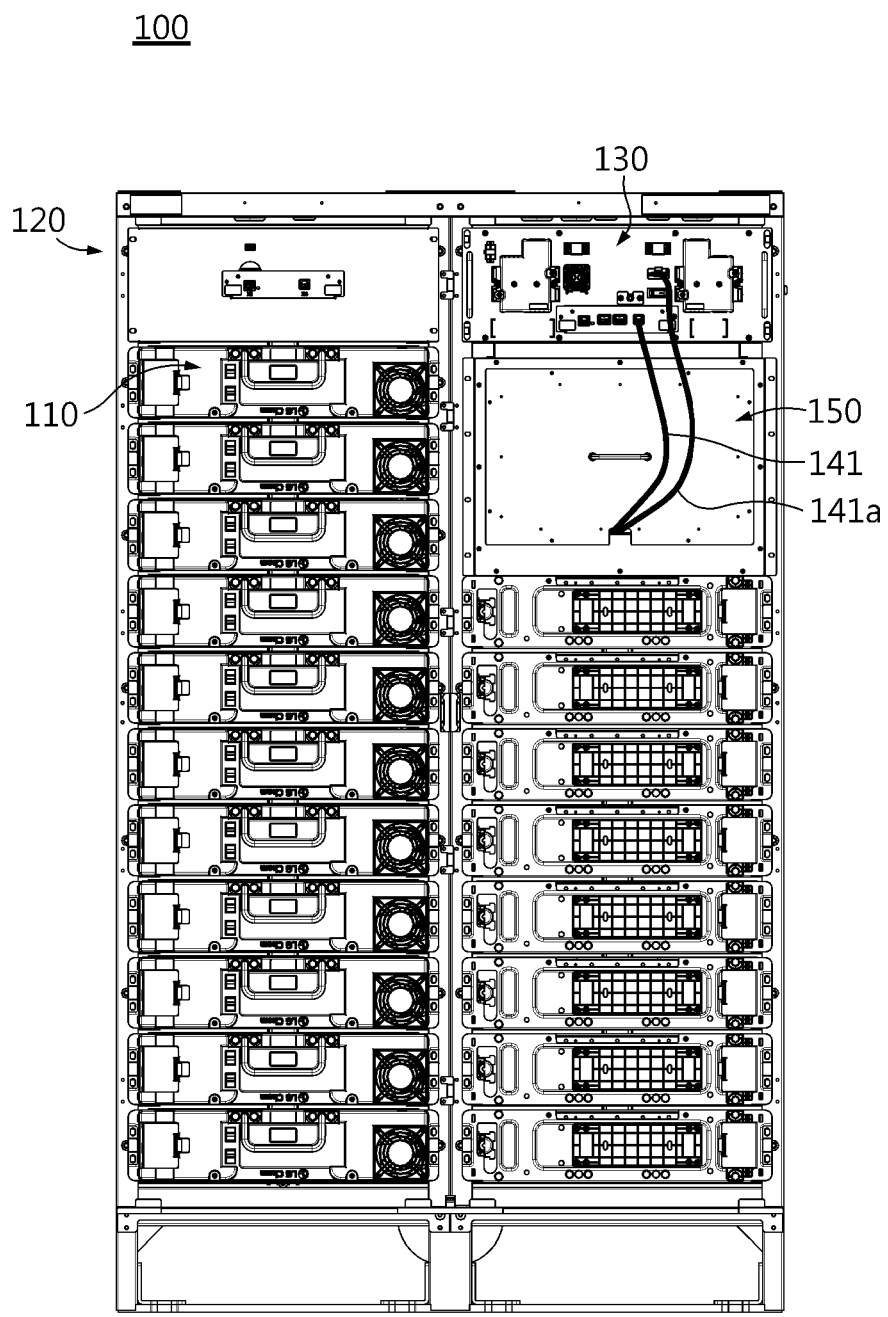
FIG. 1 is a perspective view schematically showing a state of a battery rack, according to an embodiment of the present disclosure.
Figure 2:
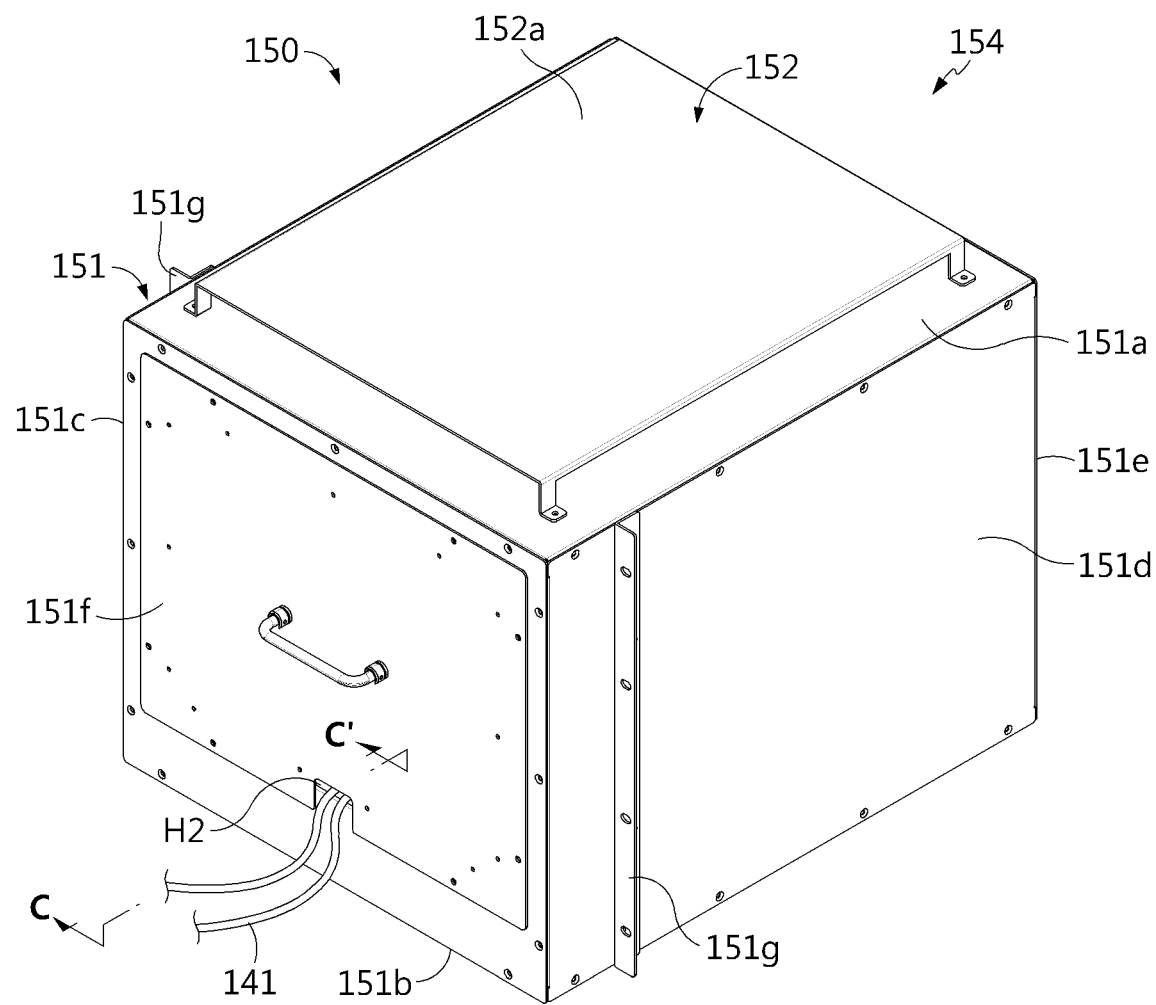
FIG. 2 is a perspective view schematically showing a state of a storage unit of a battery rack, according to an embodiment of the present disclosure.
Figure 3:
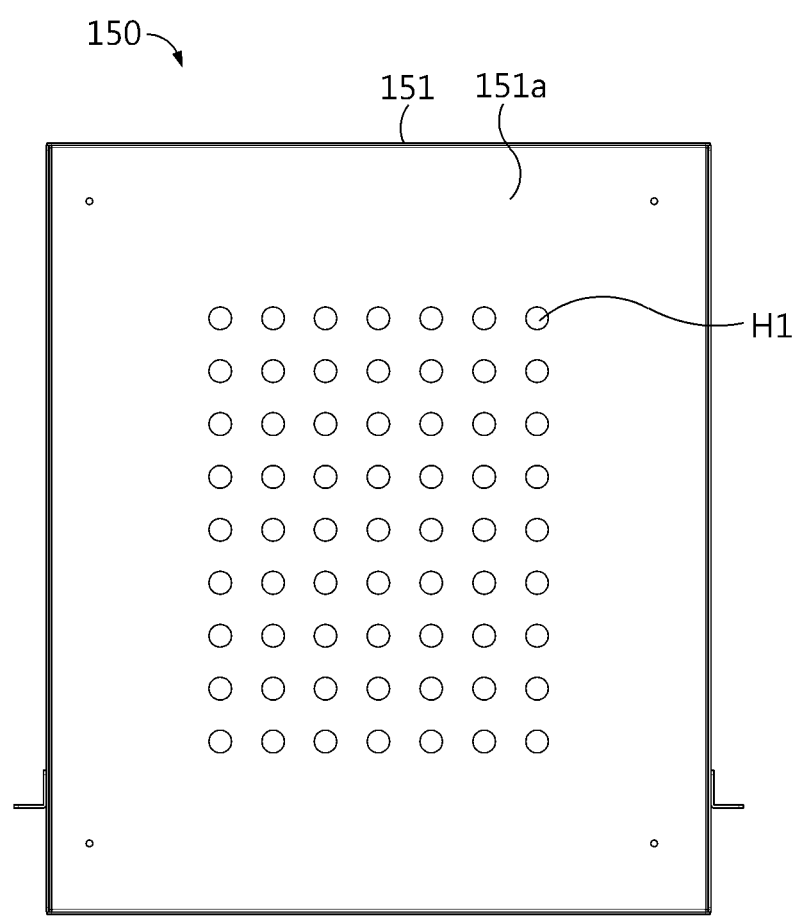
FIG. 3 is a plan view schematically showing a state of a storage unit of a battery rack, according to an embodiment of the present disclosure.
Figure 4:
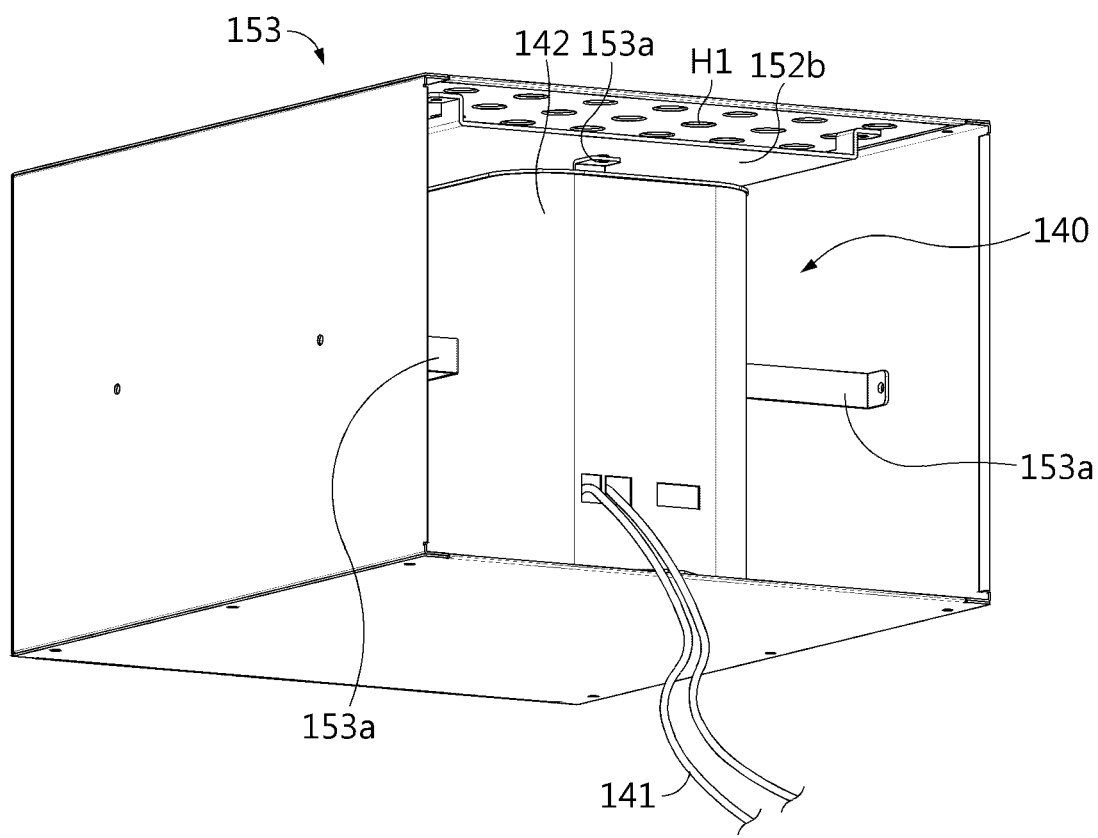
FIG. 4 is a bottom perspective view schematically showing a state of internal configurations of a storage unit of a battery rack, according to an embodiment of the present disclosure.

FIG. 1 is a perspective view schematically showing a state of a battery rack, according to an embodiment of the present disclosure. FIG. 2 is a perspective view schematically showing a state of a storage unit of a battery rack, according to an embodiment of the present disclosure. FIG. 3 is a plan view schematically showing a state of a storage unit of a battery rack, according to an embodiment of the present disclosure. In addition, FIG. 4 is a bottom perspective view schematically showing a state of internal configurations of a storage unit of a battery rack, according to an embodiment of the present disclosure. For reference, in FIG. 3, for convenience of drawing description, the storage unit is shown with an outer panel removed.

Referring to FIGS. 1 to 4, a battery rack 100 according to an embodiment of the present disclosure includes a plurality of battery modules 110, a rack case 120, a control unit 130, a data storage unit 140, and a storage unit 150.

Specifically, the plurality of battery modules 110 may be stored in the rack case 120 so as to be arranged in the vertical direction. Each of the battery modules 110 may include a module housing and a plurality of battery cells (not shown) provided in the module housing and stacked in one direction. For example, each of the battery cells may be a pouch-type battery cell.

However, the battery cell of the battery module 110 according to the present disclosure is not limited to the pouch-type battery cell described above, and various battery cells known at the time of filing of the present disclosure may be employed.

Also, the rack case 120 may be configured to accommodate the plurality of battery modules 110 therein. For example, as shown in FIG. 1, the plurality of battery modules 110 may be accommodated in an accommodating space within the rack case 120, and then bolted together. The plurality of battery modules 110 may be arranged in the vertical direction and accommodated within the rack case 120.

Furthermore, the control unit 130 may be configured to control charging and discharging of the plurality of battery modules 110. For example, the control unit 130 may include a battery management system (BMS). The control unit 130 may be configured to analyze a lifespan or a state of charge (SOC) of the battery module 110, based on information about the measured current, voltage, temperature, and the like of the battery module 110. The control unit may transmit, to the data storage unit 140, control information of the battery module 110 as an electrical signal through a cable 141, and may store data in a data recording unit 142. The cable 141 may be configured to connect between the control unit 130 and the data recording unit 142.

Also, the data storage unit 140 may include the cable 141 and the data recording unit 142. The cable 141 may be configured to transmit the data from the control unit 130 to the data recording unit 142. The data recording unit 142 may include a hard disk (not shown) to store the transmitted data. Also, the data recording unit 142 may include an external housing accommodating the hard disk. The cable 141 may include a USB terminal. The data storage unit 140 may further include a power cable 141a for supplying power.

Furthermore, the storage unit 150 may include an accommodating case 151, a plurality of ventilation holes H1, and a cover portion 152. The accommodating case 151 may have an inside space for accommodating the data recording unit 142. The accommodating case 151 may include a heat-resistant and flame-retardant material to preserve the data recording unit 142 from external force or flame. For example, the accommodating case 151 may include stainless steel, steel, a heat insulating material, and the like. The heat insulating material may be, for example, super wool or ceramic.

Also, the plurality of ventilation holes H1 may be configured such that the inside space of the accommodating case 151 and the outside are communicated with each other. That is, the plurality of ventilation holes H1 may be formed by opening a portion of the accommodating case 151. That is, the plurality of ventilation holes H1 may be formed for circulation of outside air and inside air to adjust the temperature of the data recording unit 142. As shown in FIG. 3, the plurality of ventilation holes H1 may be provided in an upper wall 151a of the accommodating case 151.

Furthermore, as shown in FIG. 2, the cover portion 152 may be configured to cover the plurality of ventilation holes H1. The cover portion 152 may have a plate shape extending in the horizontal direction along the plurality of ventilation holes H1. The cover portion 152 may be located spaced apart from an outer surface of the accommodating case 151, in which the plurality of ventilation holes H1 are formed, by a predetermined interval. That is, the storage unit 150 of the present disclosure may have a space between the accommodating case 151 and the cover portion 152 so that air may move therebetween. Accordingly, outside air may circulate through the plurality of ventilation holes H1 of the accommodating case 151.

Therefore, according to this configuration of the present disclosure, in the present disclosure, air circulation between the outside and the inside space may be performed well by the accommodating case 151 including the plurality of ventilation holes H1, and temperature adjustment of the data recording unit 142 accommodated in the storage unit 150 may be performed well.

Furthermore, the present disclosure includes the storage unit 150 including the cover portion 152, thereby preventing an external high-temperature flame from being directly introduced through the plurality of ventilation holes H1 in case of fire in the battery module 110. Accordingly, the present disclosure may prevent the data recording unit 142 from being entirely burnt down due to the fire.

More specifically, the cover portion 152 may include an outer panel 152a. The outer panel 152a may be located outside the accommodating case 151. The outer panel 152a may be spaced apart from the plurality of ventilation holes H1 by a predetermined distance. The outer panel 152a may be configured such that a plate-like edge portion is bent and extends to be coupled to the accommodating case 151. For example, as shown in FIG. 2, the outer panel 152a may be located on the accommodating case 151 to cover the plurality of ventilation holes H1 provided in an upper surface of the accommodating case 151.

Therefore, according to this configuration of the present disclosure, the present disclosure includes the outer panel 152a, thereby preventing a generated high-temperature flame from being directly introduced through the plurality of ventilation holes H1 in case of fire in the battery module 110. Accordingly, the present disclosure may prevent the data recording unit 142 from being entirely burnt down due to the fire.

Meanwhile, referring back to FIG. 4, the cover portion 152 may include an inner panel 152b. The inner panel 152b may be located in the inside space of the accommodating case 151. The inner panel 152b may be located spaced apart from the plurality of ventilation holes H1 by a predetermined distance. A space may be formed between the plurality of ventilation holes H1 and the inner panel 152b. The inner panel 152b may be configured such that a plate-like edge portion is bent and extends to be coupled to the accommodating case 151. For example, as shown in FIG. 4, the inner panel 152*b* may be located on the data recording unit 142 to cover the plurality of ventilation holes H1 provided in an inner ceiling surface of the inside space.

Therefore, according to this configuration of the present disclosure, the present disclosure includes the inner panel 152*b*, thereby preventing a generated high-temperature flame from directly affecting the data recording unit 142 through the plurality of ventilation holes H1 in case of fire in the battery module 110. Accordingly, the present disclosure may prevent the data recording unit 142 from being entirely burnt down due to the fire.

Figure 5:
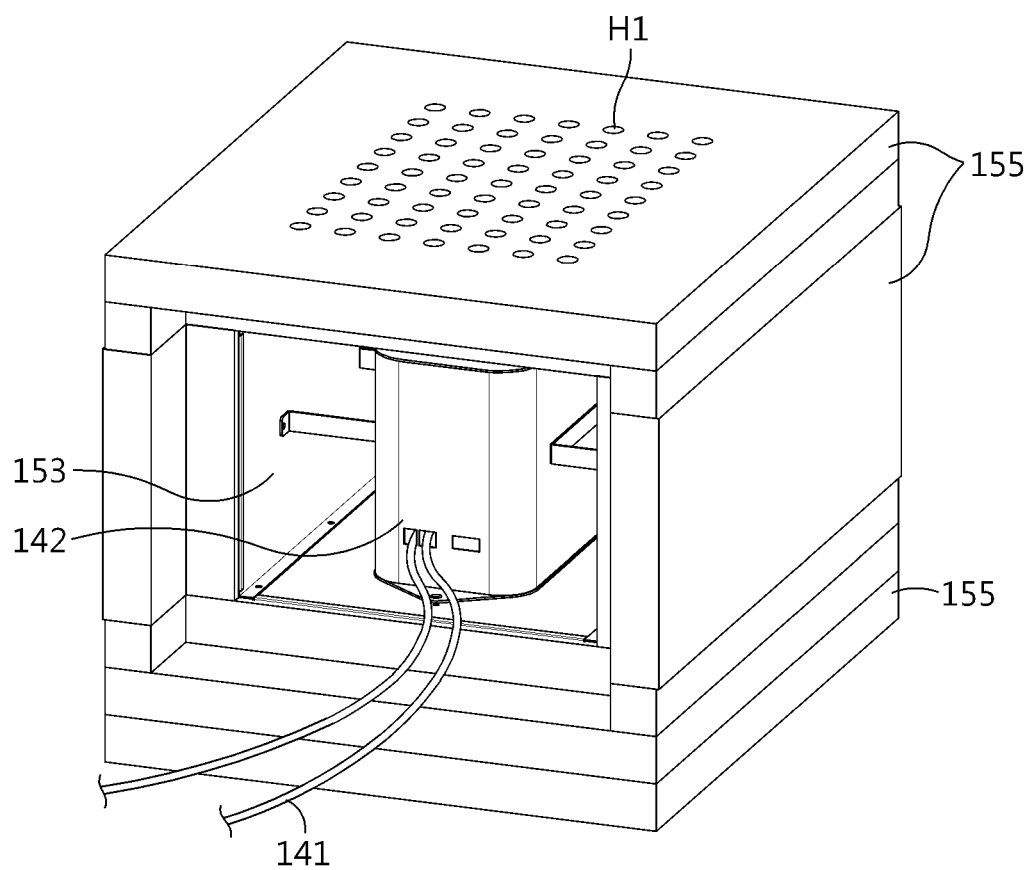
FIG. 5 is a perspective view schematically showing a state of internal configurations of a storage unit of a battery rack, according to an embodiment of the present disclosure.

FIG. 5 is a perspective view schematically showing a state of internal configurations of a storage unit of a battery rack, according to an embodiment of the present disclosure.

Referring to FIG. 5 together with FIGS. 2 and 4, the accommodating case 151 of the storage unit 150 of the battery rack 100 according to an embodiment of the present disclosure may include an inner frame 153, a heat insulating member 155, and an outer frame 154. The inner frame 153 may include an inner upper wall, an inner rear wall, and an inner side wall, which are configured to cover the data recording unit 142. The heat insulating member 155 may be provided in a multiple number to surround an outer surface of each of the inner upper wall, the inner rear wall, and the inner side wall of the inner frame 153. Also, the outer frame 154 may include an upper wall 151*a*, a lower wall 151*b*, a left wall 151*c*, a right wall 151*d*, a rear wall 151*e*, and a front door 151*f*, which are configured to surround an outer surface of the heat insulating member 155.

Meanwhile, referring to FIGS. 1 and 2, the storage unit 150 may be accommodated in the rack case 120. The storage unit 150 may include bracket members 151*g* on both side portions of the accommodating case 151. A portion of each of the bracket members 151*g* may be bolted to the accommodating case 151, and the other portion thereof may be coupled to the rack case 120.

Figure 6:
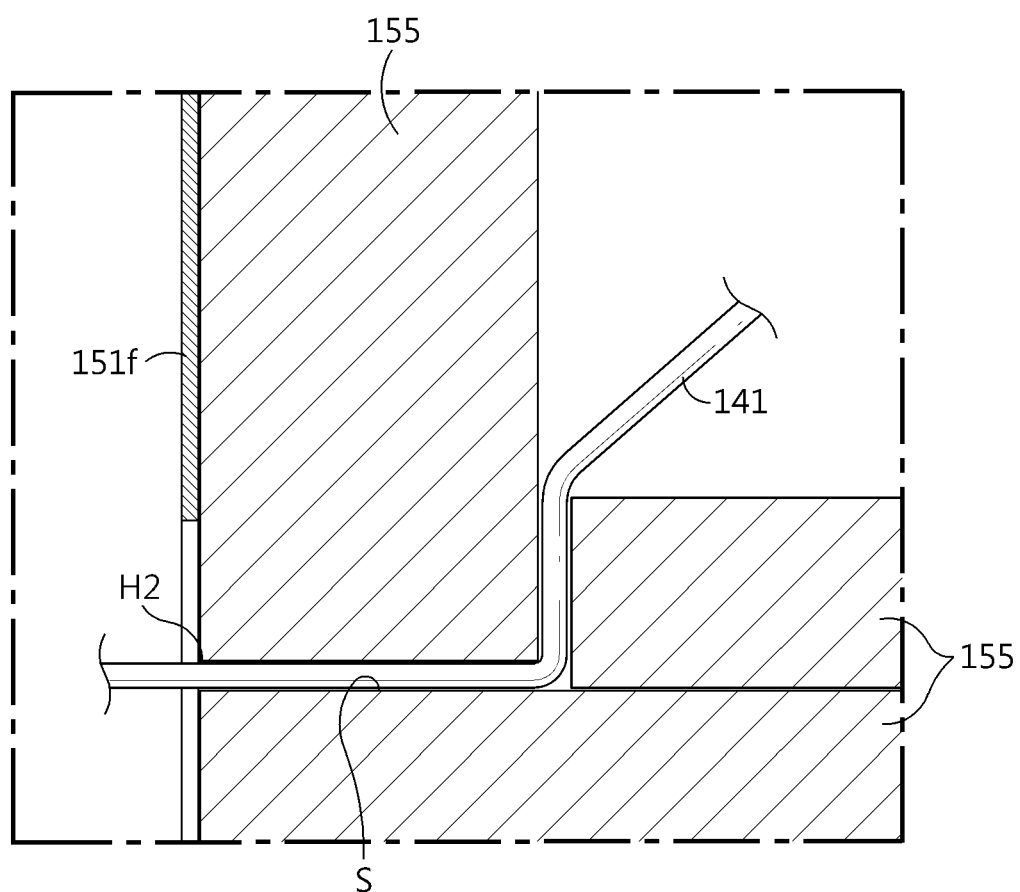
FIG. 6 is a partial vertical cross-sectional view schematically showing a state of a portion of a storage unit taken along line C-C' of FIG. 2.

FIG. 6 is a partial vertical cross-sectional view schematically showing a state of a portion of a storage unit taken along line C-C' of FIG. 2.

Referring to FIG. 6 together with FIG. 5, the accommodating case 151 may be configured such that the cable 141 is inserted, and may include a cable hole H2 and a cable insertion space S. Specifically, the cable hole H2 may be provided in the front door 151*f*. The cable hole H2 may be located in a groove portion formed by recessing an end portion of the front door 151*f*. The cable hole H2 may be formed in a gap formed between heat insulating members 155 that are separated from each other and provided inside the front door 151*f*.

Furthermore, the cable insertion space S may have a shape extending from the cable hole H2 to the inside space of the accommodating case 151 accommodating the data recording unit 142. The cable insertion space S may be bent at least once in an extended form.

For example, as shown in FIG. 6, in the storage unit 150 of the present disclosure, the cable hole H2 may be formed in a groove recessed into a lower end portion of the front door 151*f*. The storage unit 150 may include the cable insertion space S that extends from the cable hole H2 to the inside in which the data recording unit 142 is located, and is bent and extended upward again.

Therefore, according to this configuration of the present disclosure, the present disclosure includes the cable hole H2 and the cable insertion space S, thereby extending the cable 141 connected to the data recording unit 142 from the inside space of the storage unit 150 to the outside, and at the same time, preventing a flame from being introduced to the inside space for accommodating the data recording unit 142 due to a shape of the cable insertion space S that is bent at least once, even when an external flame is introduced through the cable hole H2. Accordingly, the present disclosure may safely protect the data recording unit 142 from fire even in case of fire in the battery rack 100.

Meanwhile, referring to FIG. 4 again, the inner frame 153 may further include a stopper 153*a*. The stopper 153*a* may be configured to support and fix the data recording unit 142. That is, the stopper 153*a* may fix the data recording unit 142 not to move. The stopper 153*a* may be provided on at least one of the inner upper wall, the inner rear wall, and the inner side wall of the inner frame 153. The stopper 153*a* may include a support portion supporting an outer surface of the data recording unit 142 and leg portions connected from both end portions of the support portion to inner side surfaces of the inner frame 153.

For example, as shown in FIG. 4, the storage unit 150 may include two stoppers 153*a* connected to inner side walls of the inner frame 153, and a stopper 153*a* connected to the inner panel 152*b* connected to the inner upper wall. Although not shown, the storage unit 150 may include a stopper 153*a* connected to the inner rear wall of the inner frame 153.

Therefore, according to this configuration of the present disclosure, the present disclosure includes the stopper 153*a* configured to support and fix the data recording unit 142, thereby preventing the data recording unit 142 from being damaged by falling in the inside space of the storage unit 150 or colliding with the inner surface thereof due to an external impact.

Figure 7:
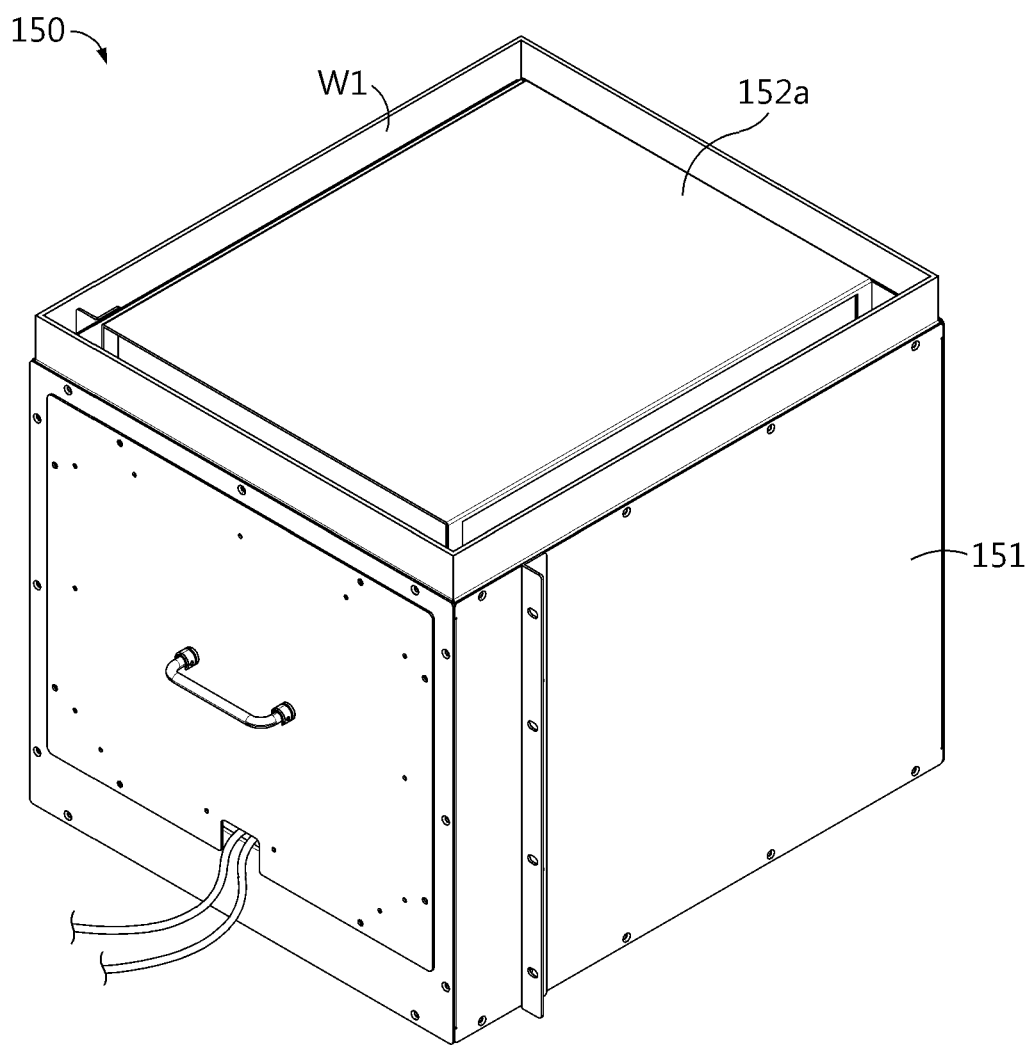
FIG. 7 is a perspective view schematically showing a state of a storage unit of a battery rack, according to another embodiment of the present disclosure.

FIG. 7 is a perspective view schematically showing a state of a storage unit of a battery rack, according to another embodiment of the present disclosure.

Referring to FIG. 7, the storage unit 150 of the battery rack 100 according to another embodiment of the present disclosure may further include a partition wall W1 when compared with the storage unit 150 of FIG. 2. However, remaining components of the storage unit 150 of FIG. 7 is the same as the storage unit 150 of FIG. 2.

Specifically, the partition wall W1 may have a shape extending outwardly from the accommodating case 151. For example, as shown in FIG. 7, the partition wall W1 may have a shape extending along an outer peripheral portion of an upper surface of the accommodating case in which the plurality of ventilation holes H1 are formed. That is, the partition wall W1 may be configured to prevent an external flame from being directly introduced into a separation space between the outer panel 152*a* and the plurality of ventilation holes H1.

Therefore, according to this configuration of the present disclosure, the present disclosure includes the partition wall W1, thereby preventing an external flame from being directly introduced to the separation space between the outer panel 152*a* and the plurality of ventilation holes H1. Accordingly, the present disclosure may safely protect the data recording unit 142 from fire even in case of fire in the battery rack 100.

Figure 8:
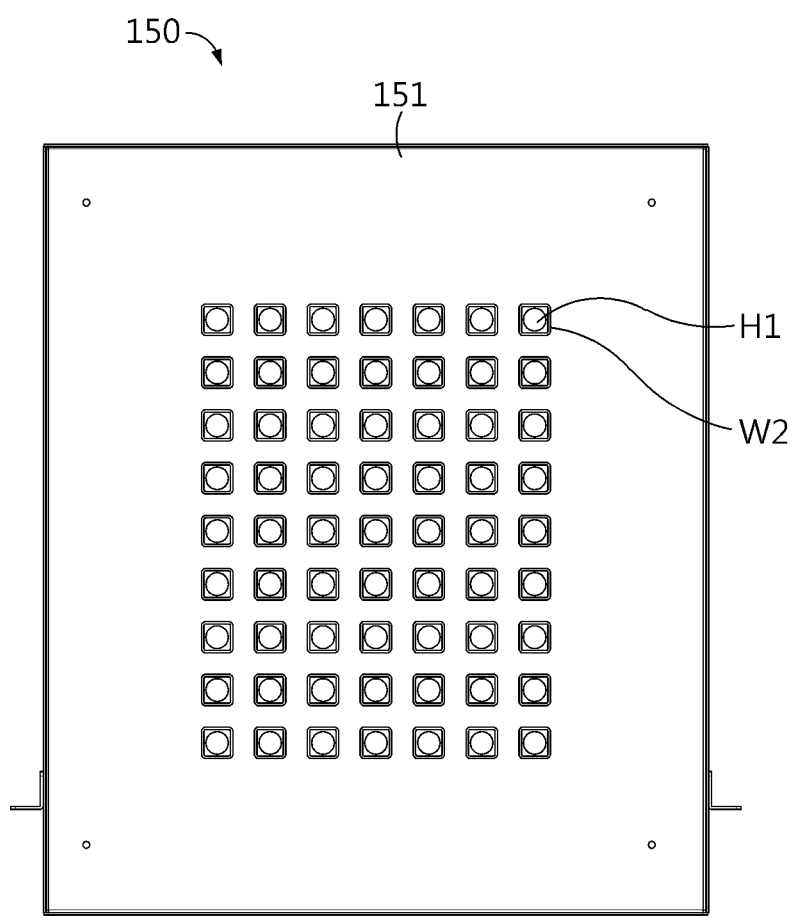
FIG. 8 is a plan view schematically showing a state of a storage unit of a battery rack, according to another embodiment of the present disclosure.

FIG. 8 is a plan view schematically showing a state of a storage unit of a battery rack, according to another embodiment of the present disclosure. In FIG. 8, for convenience of drawing description, an outer panel of the storage unit is removed.

Figure 9:
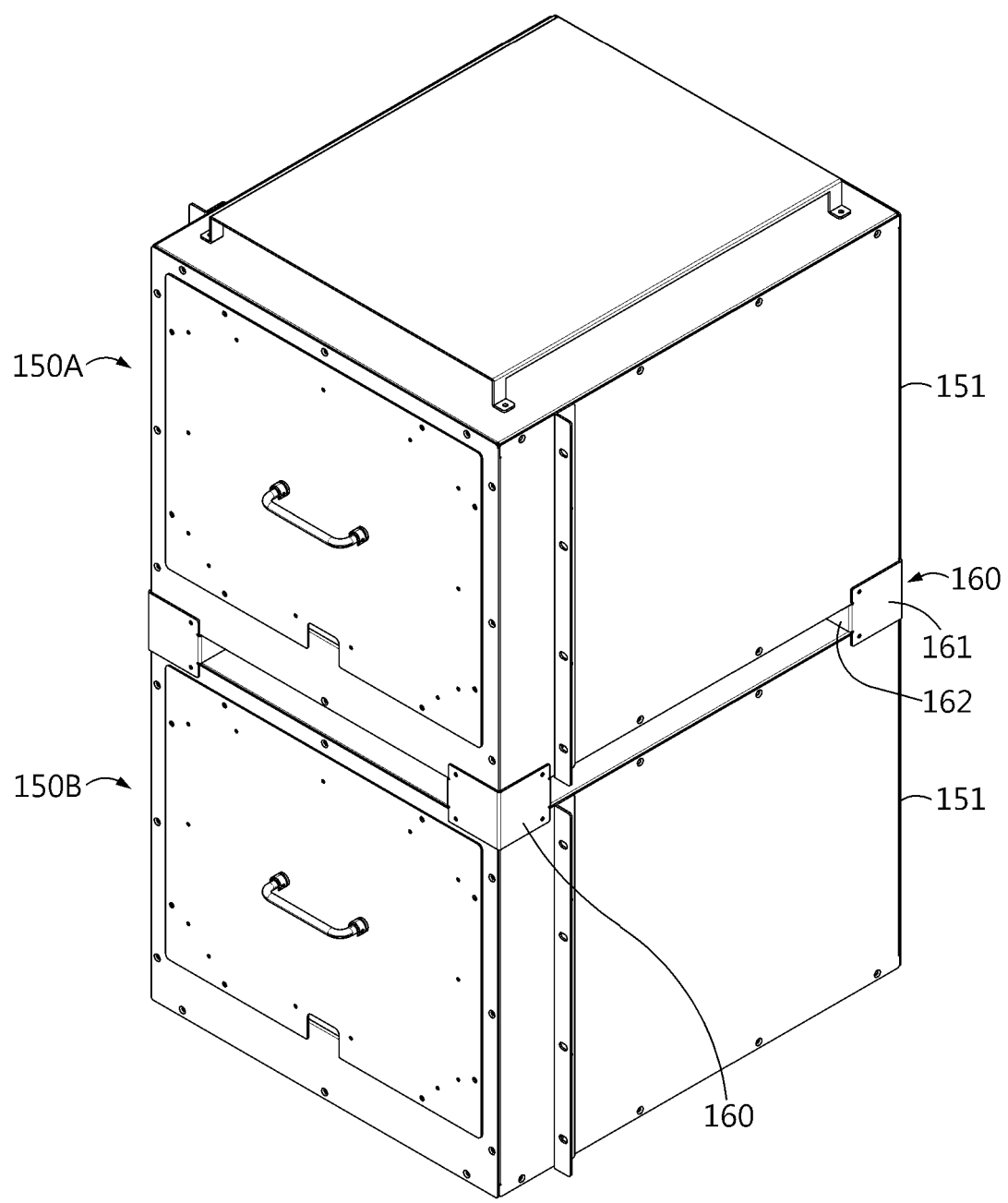
FIG. 9 is a perspective view schematically showing a state of storage units of a battery rack, according to another embodiment of the present disclosure.

Referring to FIG. 8, the storage unit 150 of the battery rack according to another embodiment of the present disclosure may include a partition wall W2 formed to surround each of the plurality of ventilation holes H1. As shown in FIG. 9, the partition wall W2 may have a shape protruding upward from an upper surface of the accommodating case 151. That is, the partition wall W2 may be configured to prevent an external flame from being directly introduced into a separation space between the outer panel 152a and the plurality of ventilation holes H1.

Therefore, according to this configuration of the present disclosure, the present disclosure includes the partition wall W2, thereby preventing an external flame from being directly introduced to the separation space between the outer panel 152a and the plurality of ventilation holes H1. Accordingly, the present disclosure may safely protect the data recording unit 142 from fire even in case of fire in the battery rack 100.

FIG. 9 is a perspective view schematically showing a state of storage units of a battery rack, according to another embodiment of the present disclosure. Also, FIG. 10 is a perspective view schematically showing a partial configuration of a storage unit of a battery rack, according to another embodiment of the present disclosure.

Figure 10:
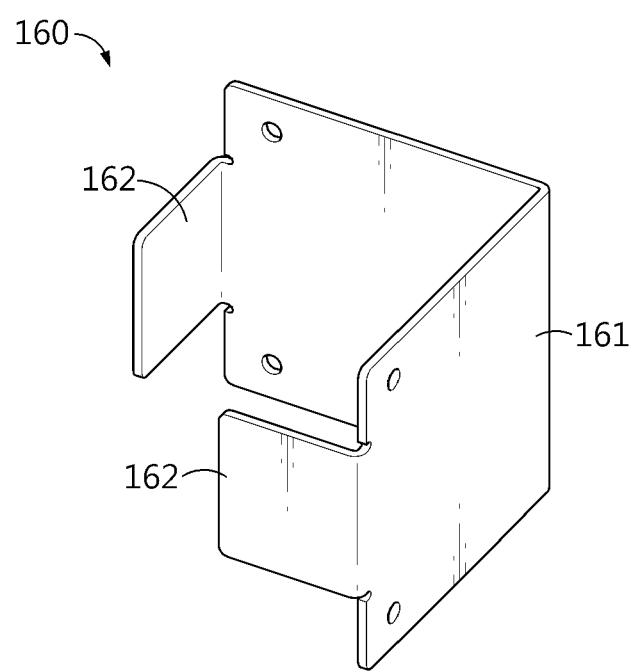
FIG. 10 is a perspective view schematically showing a partial configuration of a storage unit of a battery rack, according to another embodiment of the present disclosure.

Referring to FIGS. 9 and 10, the battery rack 100 according to another embodiment of the present disclosure may include a plurality of storage units 150A and 150B. The plurality of storage units 150A and 150B may be arranged in the vertical direction. A plurality of stacking brackets 160 may be provided between the plurality of storage units 150. A stacking bracket 160 may include a main body portion 161 and an intervening portion 162. The main body portion 161 may be coupled to each of the at least two storage units 150A and 150B, and may have a plate shape bent along an outer surface. The main body portion 161 may be bolted to the accommodating case 151 of the storage unit 150. The main body portion 161 may include a bolt hole.

Also, the intervening portion 162 may be configured to be interposed between the at least two storage units 150A and 150B. An upper portion of the intervening portion 162 may be configured to support upward a lower surface of the storage unit 150A relatively located at an upper portion, among the at least two storage units 150A and 150B. A lower portion of the intervening portion 162 may be configured to support downward an upper surface of the storage unit 150B relatively located at a lower portion, among the at least two storage units 150A and 150B.

That is, the intervening portion 162 may be configured to maintain a predetermined separation distance between the storage units 150A and 150B arranged in the vertical direction. Accordingly, in the present disclosure, a separation space is secured between the plurality of storage units 150A and 150B, thereby allowing outside air to smoothly circulate through the plurality of ventilation holes H1.

Therefore, according to this configuration of this present disclosure, the present disclosure includes the stacking bracket 160, thereby tightly binding the storage units 150A and 150B together, which are arranged in the vertical direction, and at the same time, securing the separation space between the storage units 150A and 150B. Accordingly, through the separation space between the plurality of storage units 150A and 150B, the present disclosure allows outside air to smoothly circulate through the plurality of ventilation holes H1, thereby effectively maintaining an appropriate temperature of the data recording unit 142 therein.

Meanwhile, an energy storage system (not shown) according to the present disclosure may include one or more battery racks 100 according to the present disclosure. The energy storage system may be implemented in various forms, such as a smart grid system or an electric charging station.

Meanwhile, a data storage device according to the present disclosure includes the data storage unit 140 and the storage unit 150. The data storage unit 140 may include the cable 141 configured to transmit battery control data from the control unit 130 configured to control charging and discharging of the battery module 110, and the data recording unit 142 configured to store the data. Also, the storage unit 150 may include the accommodating case 151 having an inside space for accommodating the data recording unit 142, the plurality of ventilation holes H1 formed by opening a portion of the accommodating case 151 so that the inside space and the outside are communicated with each other, and the cover portion 152 that has a plate shape, is spaced apart from the plurality of ventilation holes H1 by a predetermined interval, and is configured to cover the plurality of ventilation holes H1. The configurations of the data storage device are the same as the configurations described above, and thus, is not described in more detail here.

Meanwhile, although the terms indicating directions such as up, down, left, right, before, and after described in the present specification are used, it would be obvious to a person skilled in the art that the terms are only for convenience of description and may vary depending on the position of an object or the position of an observer.

As described above, although the present disclosure has been described with reference to limited embodiments and drawings, the present disclosure is not limited thereto, and various modifications and variations are possible within the technical idea of the present disclosure and the scope of equivalents of the claims to be described below by those of ordinary skill in the art to which the present disclosure pertains.

What is claimed is:

1. A battery rack comprising:
a plurality of battery modules;
a rack case configured to store the plurality of battery modules;
a control unit configured to control charging and discharging of the plurality of battery modules;
a cable configured to transmit control data from the control unit and a data recorder configured to store the data; and
at least one accommodating case having an inside space for accommodating the data recorder, a plurality of ventilation holes in the at least one accommodating case so that the inside space and outside are communicated with each other, and a cover that has a plate shape, is spaced apart from the plurality of ventilation holes by a predetermined interval, and is configured to cover the plurality of ventilation holes.

2. The battery rack of claim 1, wherein the cover comprises an outer panel located outside the at least one accommodating case, spaced apart from the plurality of ventilation holes by a first predetermined distance, and configured such that an edge portion is bent and extends to be coupled to the at least one accommodating case.

3. The battery rack of claim 1, wherein the cover comprises an inner panel located in the inside space of the at least one accommodating case, spaced apart from the plurality of ventilation holes by a second predetermined distance, and configured such that an edge portion is bent and extends to be coupled to the at least one accommodating case.

4. The battery rack of claim 1, wherein the at least one accommodating case comprises:

an inner frame comprising an inner upper wall, an inner rear wall, and an inner side wall, which are configured to cover the data recorder;

a heat insulating member configured to surround an outer surface of each of the inner upper wall, the inner rear wall, and the inner side wall of the inner frame; and an outer frame comprising an upper wall, a lower wall, a left wall, a right wall, and a front door, which are configured to surround an outer surface of the heat insulating member.

5. The battery rack of claim 4, wherein the at least one accommodating case further comprises:

a cable hole configured such that the cable is inserted, the cable hole being formed in the front door; and a cable insertion space extending from the cable hole to the inside space and bending at least once.

6. The battery rack of claim 4, wherein the inner frame comprises a stopper configured to support and fix the data recorder to at least one of the inner upper wall, the inner rear wall, and the inner side wall.

7. The battery rack of claim 1, wherein the at least one accommodating case comprises at least one outwardly extending partition wall.

8. The battery rack of claim 1, wherein the at least one accommodating case is at least two accommodating cases arranged in a vertical direction; and a stacking bracket comprising a main body portion coupled to each of the at least two accommodating cases and bent along an outer surface, and an intervening portion bent and extending from an end portion of the main body portion to be interposed between the at least two accommodating cases.

9. An energy storage system comprising at least one battery rack according to claim 1.

10. The battery rack of claim 1, wherein the plurality of ventilation holes are in a top wall of the at least one accommodating case, and wherein a wall extends upwardly from a perimeter of the top wall.

11. The battery rack of claim 1, wherein the plurality of ventilation holes are in a top wall of the at least one accommodating case, and wherein a wall extends upwardly around each of the plurality of ventilation holes.

12. A data storage device comprising:

a data storage unit comprising a cable configured to transmit battery control data from a control unit configured to control charging and discharging of a battery module, and a data recorder configured to store the data; and an accommodating case having an inside space for accommodating the data recording unit, a plurality of ventilation holes in the accommodating case so that the inside space and outside are communicated with each other, and a cover that has a plate shape, is spaced apart from the plurality of ventilation holes by a predetermined interval, and is configured to cover the plurality of ventilation holes.

13. The battery rack of claim 12, wherein the plurality of ventilation holes are in a top wall of the accommodating case, and wherein a wall extends upwardly from a perimeter of the top wall.

14. The battery rack of claim 12, wherein the plurality of ventilation holes are in a top wall of the accommodating case, and wherein a wall extends upwardly around each of the plurality of ventilation holes.

* * * * *